United States Patent
Ko et al.

(10) Patent No.: US 8,942,633 B2
(45) Date of Patent: Jan. 27, 2015

(54) SYSTEMS AND METHODS FOR ACTIVITY COORDINATION IN MULTI-RADIO TERMINALS

(75) Inventors: Li-Chun Ko, Taipei (TW); Hong-Kai Hsu, Yonghe (TW); I-Kang Fu, Taipei (TW); Chi-Chen Lee, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 653 days.

(21) Appl. No.: 13/187,156

(22) Filed: Jul. 20, 2011

(65) Prior Publication Data

US 2011/0274080 A1 Nov. 10, 2011

Related U.S. Application Data

(63) Continuation-in-part of application No. 12/925,475, filed on Oct. 22, 2010.

(60) Provisional application No. 61/365,891, filed on Jul. 20, 2010, provisional application No. 61/254,771, filed on Oct. 26, 2009.

(51) Int. Cl.
*H04B 1/00* (2006.01)
*H04B 15/00* (2006.01)
(Continued)

(52) U.S. Cl.
CPC .......... *H04W 72/1215* (2013.01); *H04W 88/06* (2013.01)
USPC ........ 455/63.1; 455/448; 455/450; 455/452.1

(58) Field of Classification Search
CPC ..... H04L 5/0044; H04L 41/12; H04W 8/005; H04W 72/1215; H04W 74/04; H04W 16/14; H04W 28/26; H04W 40/16
USPC .......... 455/41.2, 63.1, 448, 450, 452.1, 452.2
See application file for complete search history.

(56) References Cited

U.S. PATENT DOCUMENTS 5,696,903 A * 12/1997 Mahany ........................ 709/228
8,626,067 B2 1/2014 Ko et al.
(Continued)

FOREIGN PATENT DOCUMENTS

CN 101444006 5/2009
CN 101646245 2/2010
(Continued)

OTHER PUBLICATIONS

English language translation of abstract of CN 101646245 (published Feb. 10, 2010).

*Primary Examiner* — Yuwen Pan
*Assistant Examiner* — Ayodeji Ayotunde
(74) *Attorney, Agent, or Firm* — McClure, Qualey & Rodack, LLP

(57) ABSTRACT

A wireless communication device is provided with a first radio module and a second radio module inside. The first radio module performs wireless transceiving according to a plurality of first traffic patterns which each indicates allocations of a plurality of first slots for a plurality of forthcoming transmitting or receiving operations, respectively. The second radio module determines an indicator indicating at least one of a plurality of second traffic patterns which each indicates allocations of a plurality of second slots for a plurality of forthcoming transmitting or receiving operations, respectively. Particularly, one or more allocations of the second slots are selectively determined according to the first traffic patterns. Also, the second radio module transmits the indicator to a peer communication device, so that the peer communication device performs transmitting or receiving operations according to the indicator.

16 Claims, 11 Drawing Sheets

(51) Int. Cl.
*H04W 72/12* (2009.01)
*H04W 40/00* (2009.01)
*H04W 72/00* (2009.01)
*H04W 88/06* (2009.01)

(56) References Cited

U.S. PATENT DOCUMENTS

| | | | |
|---|---|---|---|
| 2002/0093929 A1* | 7/2002 | Mangold et al. | 370/336 |
| 2006/0203841 A1* | 9/2006 | Fischer | 370/461 |
| 2007/0109973 A1* | 5/2007 | Trachewsky | 370/252 |
| 2007/0263709 A1 | 11/2007 | Kasslin et al. | |
| 2008/0139212 A1* | 6/2008 | Chen et al. | 455/450 |
| 2008/0247445 A1 | 10/2008 | Guo et al. | |
| 2009/0003307 A1 | 1/2009 | Yang et al. | |
| 2009/0010231 A1* | 1/2009 | Laroia et al. | 370/338 |
| 2009/0013081 A1* | 1/2009 | Laroia et al. | 709/228 |
| 2009/0054009 A1* | 2/2009 | Yang et al. | 455/78 |
| 2009/0080401 A1 | 3/2009 | Zhu et al. | |
| 2009/0086712 A1 | 4/2009 | Liu et al. | |
| 2009/0147763 A1* | 6/2009 | Desai et al. | 370/343 |
| 2009/0180451 A1* | 7/2009 | Alpert et al. | 370/338 |
| 2009/0196210 A1* | 8/2009 | Desai | 370/311 |
| 2009/0279511 A1* | 11/2009 | Zhu | 370/336 |
| 2009/0291701 A1 | 11/2009 | Zetterman et al. | |
| 2010/0061326 A1 | 3/2010 | Lee et al. | |
| 2010/0197234 A1 | 8/2010 | Linde et al. | |
| 2011/0097998 A1 | 4/2011 | Ko et al. | |

FOREIGN PATENT DOCUMENTS

| | | |
|---|---|---|
| WO | WO 2007/132319 | 11/2007 |
| WO | WO 2008/070777 | 6/2008 |

* cited by examiner

SYSTEMS AND METHODS FOR ACTIVITY COORDINATION IN MULTI-RADIO TERMINALS

CROSS REFERENCE TO RELATED APPLICATIONS

This application is a continuation-in-part of application Ser. No. 12/925,475, filed on Oct. 22, 2010, which claims benefit of U.S. Provisional Application No. 61/254,771, filed on Oct. 26, 2009. This application also claims the benefits of U.S. Provisional Application No. 61/365,891, filed on Jul. 20, 2010, and the entirety of which is incorporated by reference herein.

BACKGROUND OF THE INVENTION

1. Field of the Invention

The invention relates generally to coexisting designs of multiple radio modules in a wireless communication device, and more particularly to an activity coordination method for coordinating the operations of the multiple radio modules such that interference between the multiple radio modules may be efficiently reduced while saving power.

2. Description of the Related Art

The Institute of Electrical and Electronics Engineers (IEEE) has adopted a series of standards for both Wireless Local Area Networks (WLANs) known as 802.11 and Wireless Metropolitan Area Networks (WMANs) known as 802.16. It is commonly known that Wireless Fidelity (WiFi) refers to interoperable implementations of the IEEE 802.11 technology, and Worldwide Interoperability for Microwave Access (WiMAX) refers to interoperable implementations of the IEEE 802.16 technology. On the other hand, Bluetooth (BT) is a wireless standard for Wireless Personal Area Networks (WPANs) developed by the BT special interest group (SIG). BT provides a secure way for exchanging data over short distances using frequency-hopping spread spectrum technology. Due to scarce radio spectrum resource, different technologies are allowed to operate in overlapping or adjacent radio spectrums. For example, WiFi often operates at 2.412-2.4835 GHz, WiMAX often operates at 2.3-2.4 or 2.496-2.690 GHz, and BT often operates at 2.402-2.480 GHz.

As the demand for wireless communication continues to increase, wireless communication devices such as cellular telephones, Personal Digital Assistants (PDAs), laptop computers, etc., are increasingly being equipped with multiple radios. A Multiple Radio Terminal (MRT) may simultaneously include BT, WiMAX, and WiFi radios. Simultaneous operation of multiple radio modules co-located on the same physical device, however, can suffer from significant degradation including significant interference therebetween because of the overlapping or adjacent radio spectrums. Due to physical proximity and radio power leakage, when the data transmission of a first radio module overlaps with the data reception of a second radio module in the same time domain, the data reception of the second radio module can be hindered due to interference from the data transmission of the first radio module. Likewise, data transmission of the second radio module can interfere with data reception of the first radio module.

FIG. 1 is a schematic diagram illustrating interference between a Mobile Wireless System (MWS) radio module 11 and a BT master radio module 12 that are co-located in an MRT. Both of the MWS radio module 11 and the BT master radio module 12 transmit and receive data via scheduled transmitting (TX) and receiving (RX) time slots on a frame-by-frame basis. For example, in each MWS frame, the first five consecutive RX slots are scheduled for receiving operations and the three consecutive TX slots are scheduled for transmitting operations. Due to the fact that the MWS radio module 11 and the BT master radio module 12 are co-located within the MRT 10, the transmission of one radio module will generally interfere with the reception of another radio module. As shown in FIG. 1, data receptions in the three RX time slots of the BT master radio module 12 are interfered by concurrent data transmissions in TX time slots of the MWS radio module 11, and data receptions in the six RX time slots of the MWS radio module 11 are interfered by concurrent data transmissions in TX time slots of the BT master radio module 12.

FIG. 2 is a schematic diagram illustrating traffic patterns of a BT master radio module 22 affected by a co-located MWS radio module 21. The traffic pattern of the MWS radio module 21 remains the same as the traffic pattern of the MWS radio module 11 in FIG. 1, while the BT master radio module 22 has an Extended Voice (EV3) traffic pattern using an Extended Synchronous Connection Oriented (eSCO) link with $T_{eSCO}=6$ and $W_{eSCO}=4$. Under such EV3 traffic pattern, the BT master radio module 22 has one scheduled TX time slot followed by one scheduled RX time slot for every six BT slots (i.e., $T_{eSCO}=6$), and has four retransmission opportunities (i.e., $W_{eSCO}=4$). Note that, in the example of FIG. 2, the BT master radio module 22 uses low transmission power, so that the data transmissions of the BT master radio module 22 does not interfere with the data receptions of the MWS radio module 21, but the data transmissions of the MWS radio module 21 interferes with the data receptions of the BT master radio module 22. Specifically, in eSCO window #2, the EV3 data reception in the first scheduled EV3 RX time slot is corrupted by the concurrent data transmission of the MWS radio module 21, causing the BT master radio module 22 to re-transmit the EV3 data to a BT slave in the following EV3 TX time slot and to receive EV3 data from the BT slave in the following EV3 RX time slot. For such a case, it is obvious that the BT master radio module 22 needs to consume 25% more power due to interference from the co-located MWS radio module 21.

BRIEF SUMMARY OF THE INVENTION

In light of the previously described problems, it is desirable to have a solution for improving efficiency and saving power for multiple radio modules co-located within the same MRT.

One aspect of the invention discloses a wireless communication device comprising a first radio module and a second radio module. The first radio module performs wireless transceiving in compliance with a first communication protocol and according to a plurality of first traffic patterns which each indicates allocations of a plurality of first slots for a plurality of forthcoming transmitting or receiving operations, respectively. The second radio module performs wireless transceiving in compliance with a second communication protocol, and determines an indicator indicating at least one of a plurality of second traffic patterns which each indicates allocations of a plurality of second slots for a plurality of forthcoming transmitting or receiving operations, respectively, wherein one or more allocations of the second slots are selectively determined according to the first traffic patterns, prior to the determining of the indicator. Also, the second radio module transmits the indicator to a peer communication device, so that the peer communication device performs transmitting or receiving operations to and from the second radio module according to the at least one of the second traffic patterns indicated by the indicator.

Another aspect of the invention discloses an activity coordination method for a wireless communication device comprising a plurality of co-located radio modules. The activity coordination comprises the steps of: providing a first radio module for performing wireless transceiving in compliance with a first communication protocol and according to a plurality of first traffic patterns which each indicates allocations of a plurality of first slots for a plurality of forthcoming transmitting or receiving operations, respectively; providing a second radio module for performing wireless transceiving in compliance with a second communication protocol; determining, by the second radio module, an indicator indicating at least one of a plurality of second traffic patterns which each indicates allocations of a plurality of second slots for a plurality of forthcoming transmitting or receiving operations, respectively, wherein one or more allocations of the second slots are selectively determined according to the first traffic patterns; and transmitting, by the second radio module, the indicator to a peer communication device, so that the peer communication device performs transmitting or receiving operations to and from the second radio module according to the at least one of the second traffic patterns indicated by the indicator.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
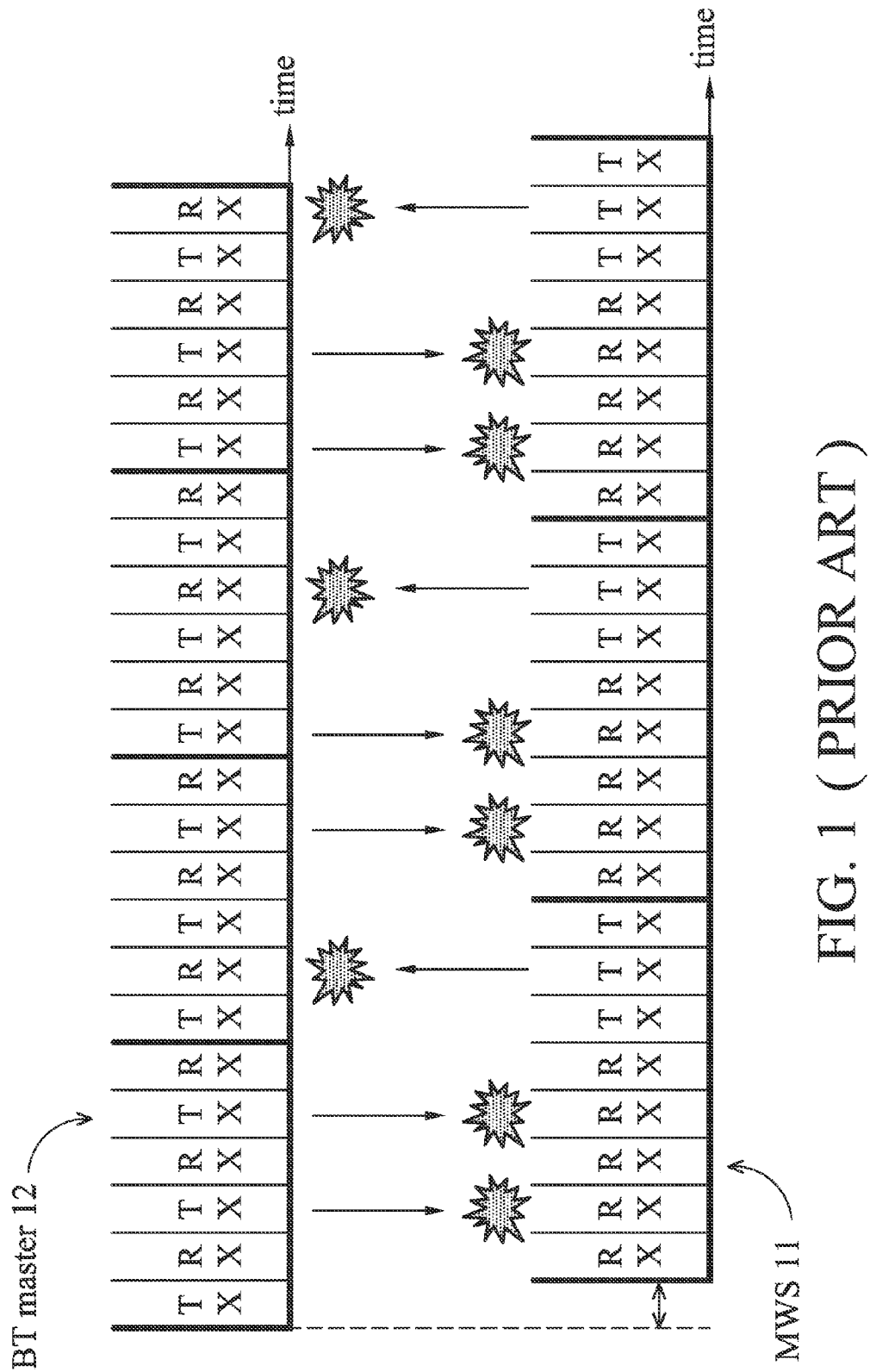
FIG. 1 is a schematic diagram illustrating interference between a Mobile Wireless System (MWS) radio module 11 and a BT master radio module 12 that are co-located in an MRT 10.
Figure 2:
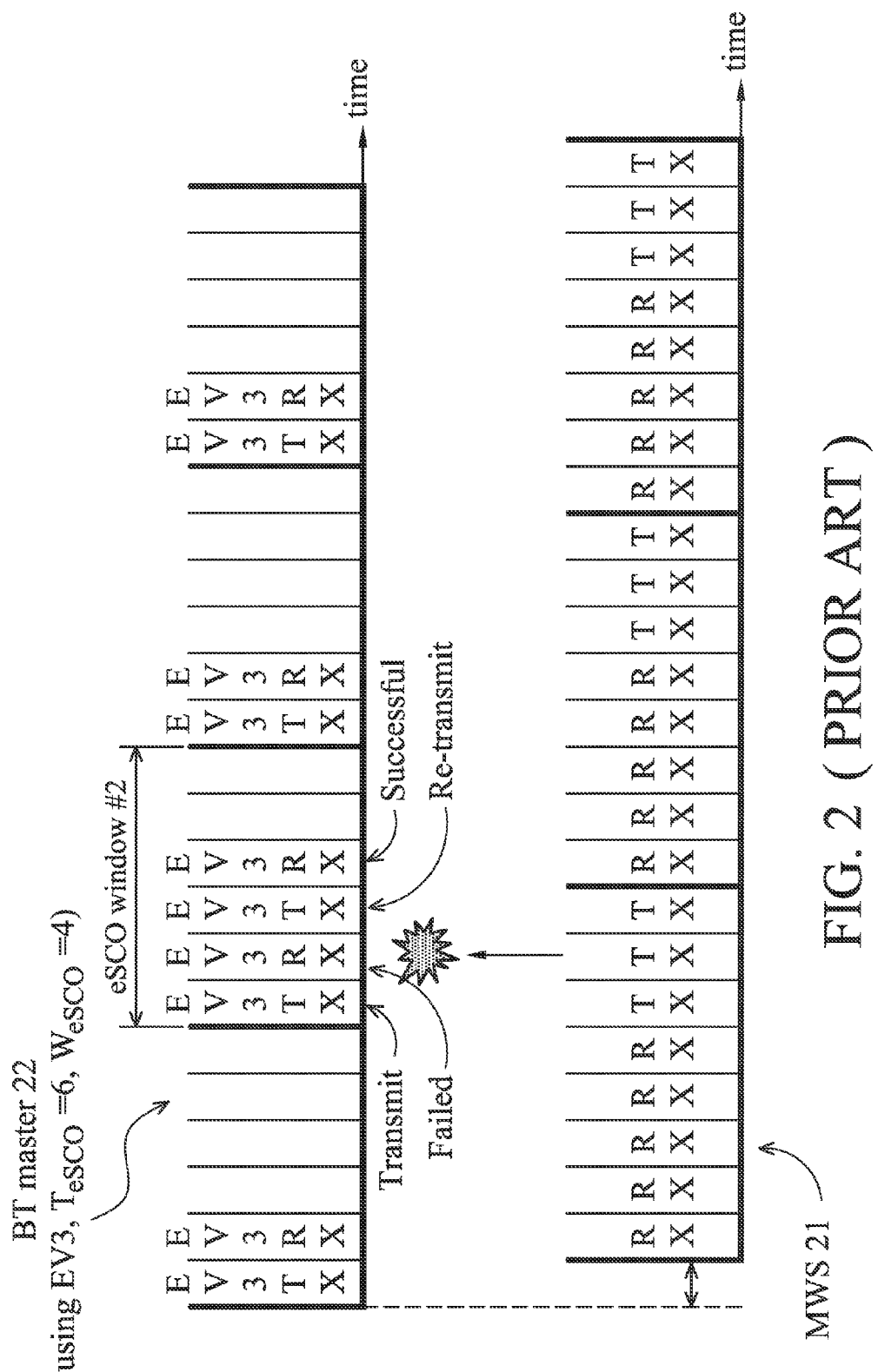
FIG. 2 is a schematic diagram illustrating traffic patterns of a BT master radio module 22 affected by a co-located MWS radio module 21.
Figure 3:
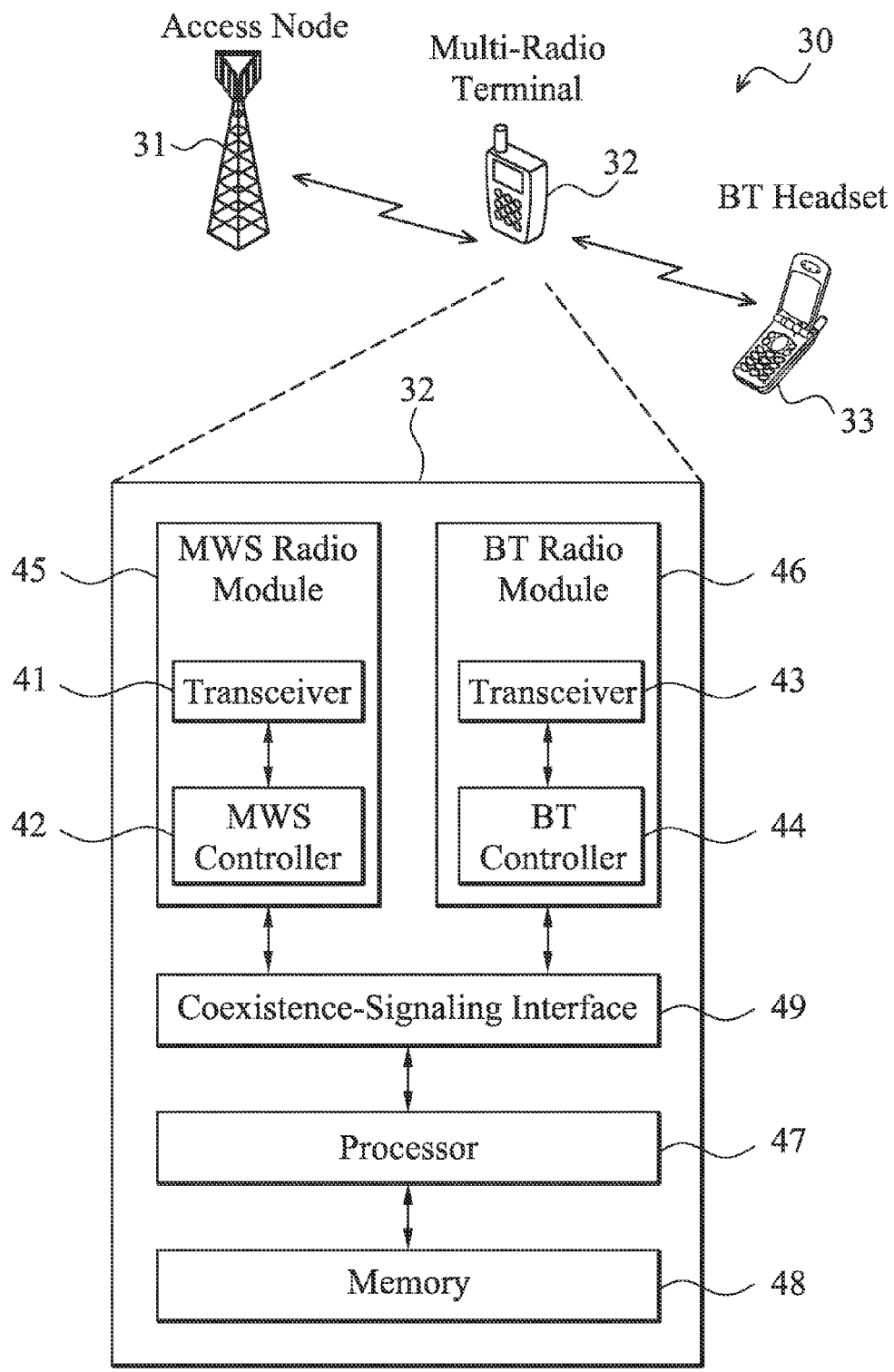
FIG. 3 is a block diagram illustrating a Multi-Ratio Terminal (MRT) 32 in a wireless communication system 30 according to an embodiment of the invention.

FIG. 3 is a block diagram illustrating a Multi-Ratio Terminal (MRT) 32 in a wireless communication system 30 according to an embodiment of the invention. The wireless communication system 30 comprises an access node 31, an MRT 32, and a Bluetooth (BT) headset 33. The MRT 32 includes a first radio module, e.g., a Mobile Wireless System (MWS) radio module 45, and a second radio module, e.g., a BT radio module 46. The MRT 32 communicates with the access node 31 using the MWS radio module 45, and communicates with the BT headset 33 using the BT radio module 46. The MWS radio module 45 comprises a transceiver 41 and an MWS controller 42. The BT radio module 46 comprises a transceiver 43 and a BT controller 44. The MWS controller 42 and the BT controller 44 may communicate with each other via a coexistence-signaling interface 49. The Coexistence-signaling interface 49 is also connected to a processor 47 and a memory 48 of the MRT 32. Although the coexistence signaling interface 49 is denoted as one module, it may include both hardware and software implementations of multiple functional components, such as the hardware implementation of functional component(s) for timing/synchronization controls between the MWS radio module 45 and the BT radio module 46, and the software implementation of functional component(s) for traffic information exchange between the MWS radio module 45 and the BT radio module 46, etc., and the invention is not limited thereto.

In one embodiment, the MWS radio module 45 is a WiMAX radio module that operates at 2.3-2.4 or 2.496-2.690 GHz, while the BT radio module 46 operates at 2.402-2.480 GHz. In another embodiment, the MWS radio module 45 is a WiFi radio module that operates at 2.412-2.4835 GHz, while the BT radio module 46 operates at 2.402-2.480 GHz. Simultaneous operation of multiple radio modules co-located in the same wireless communication device may suffer significant degradation including significant interference therebetween because of the overlapping or adjacent radio spectrums. This is especially true when both of the MWS radio module 45 and the BT radio module 46 use the time division multiplexing (TDM) protocol for data communications. Under the TDM mode, when a scheduled time slot for data transmission of a first radio module overlaps with a scheduled time slot for data reception of a second radio module, the data reception of the second radio module may be hindered due to interference from the data transmission of the first radio module. Likewise, the data transmission of the second radio module may interfere with the data reception of the first radio module. In order to solve this interference problem, the invention proposes an activity coordination method for coordinating the operations of the multiple radio modules such that interference between the multiple radio modules may be greatly reduced.

Figure 4:
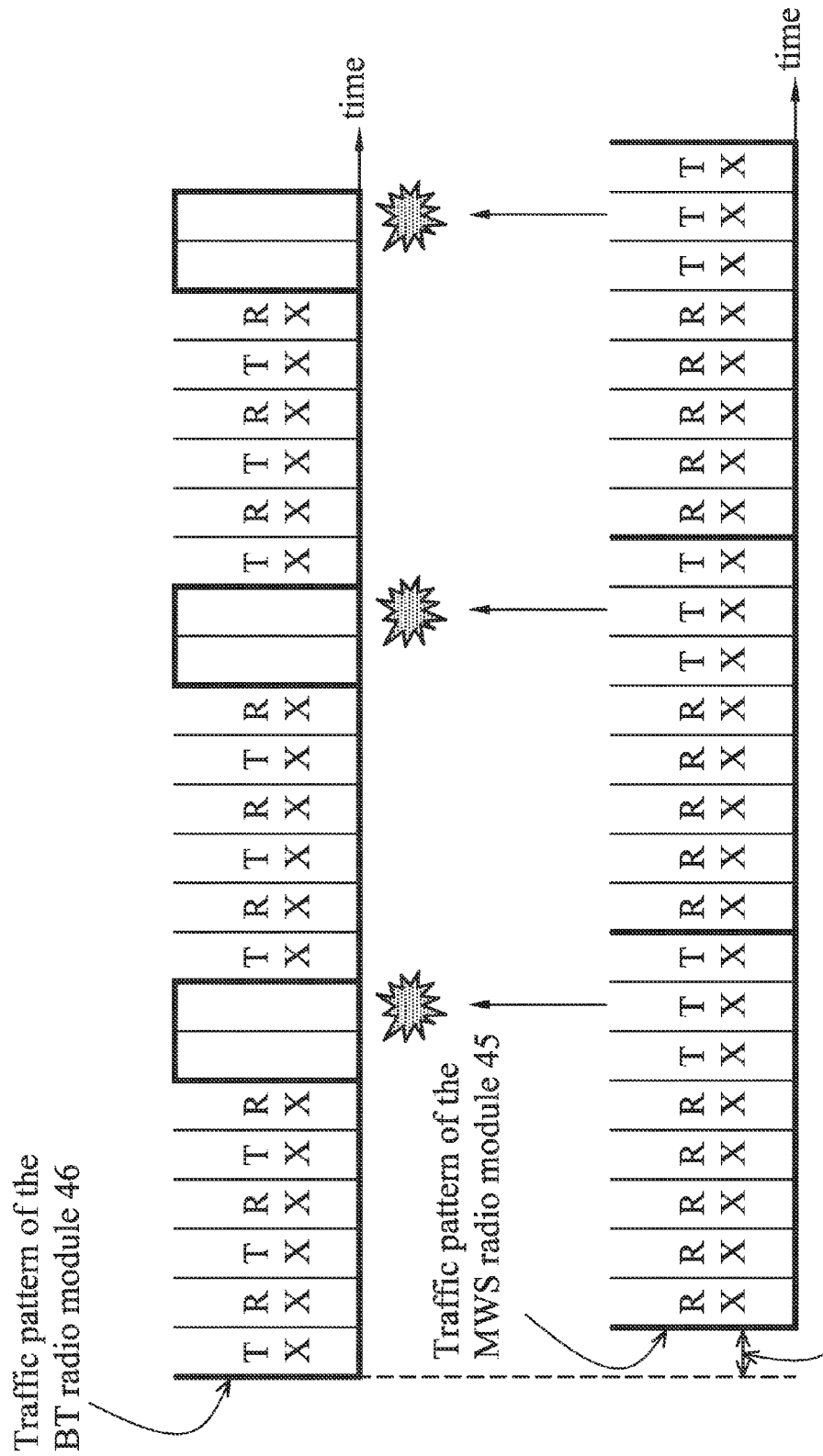
FIG. 4 is a schematic diagram illustrating the BT radio module 46 selectively skipping scheduled time slots according to an embodiment of the invention.

To further clarify, it is proposed for the BT radio module 46 to selectively skip one or more scheduled transmitting (TX) and/or receiving (RX) time slots to improve scheduling efficiency and thereby save power via the coexistence-signaling interface 49. FIG. 4 is a schematic diagram illustrating the BT radio module 46 selectively skipping scheduled time slots according to an embodiment of the invention. As shown in FIG. 4, the MWS radio module 45 has a typical MWS traffic pattern in which each MWS frame contains eight time slots including five consecutive RX slots followed by three consecutive TX slots. On the other hand, the BT radio module 46 is a BT master using the Time Division Duplex (TDD)

scheme to communicate with a BT slave and it has an Asynchronous Connection-Oriented (ACL) traffic pattern, wherein the BT radio module 46 alternates TX and RX operations. The BT radio module 46 first aligns its communication slots with the MWS radio module 45. Specifically, the start of a packet should be aligned with the start of a slot. The BT radio module 46 then obtains the traffic pattern of the MWS radio module 45 via the coexistence-signaling interface 49. Based on the obtained traffic pattern, the BT radio module 46 deliberately gives up certain scheduled TX and RX slots (denoted with a thick-lined box) that will be affected by the co-located MWS radio module 45 to save power, since the data reception in the thick-lined box is estimated to be unsuccessful due to the interference from the data transmission of the MWS radio module 45. Also, the BT radio module 46 generates RX/TX Co-Located Coexistence (CLC) bitmaps according to the traffic pattern of the MWS radio module 45, and negotiates with the BT headset 33 for the RX/TX CLC bitmap so that the BT headset 33 may obtain the RX/TX CLC bitmap and also skip data transmission or reception in certain time slots affected by the MWS radio module 45. During the skipped time slots, TX or RX operation is given up by disabling or turning off the transceiver 43 to save power consumption.

In one embodiment, the BT radio module 46 may selectively give up one or more scheduled TX slots if a corresponding acknowledgement of the transmitted data is estimated to not have been received successfully due to interference from the co-located MWS radio module 45, and similarly, the BT headset 33 may selectively give up one or more scheduled TX slots if it is estimated that the data to be transmitted would not be received by its peer BT device successfully. In another embodiment, the BT radio module 46 may selectively give up one or more scheduled TX slots if it is estimated that data transmission in the TX slots would interfere with data reception of the co-located MWS radio module 45. In yet another embodiment, the BT radio module 46 may selectively give up one or more scheduled RX slots if the receiving operation is affected by interference from the co-located MWS radio module 45, and similarly, the BT headset 33 may selectively give up one or more scheduled RX slots if it is estimated that its peer BT device will not transmit data in the RX slots.

Figure 5:
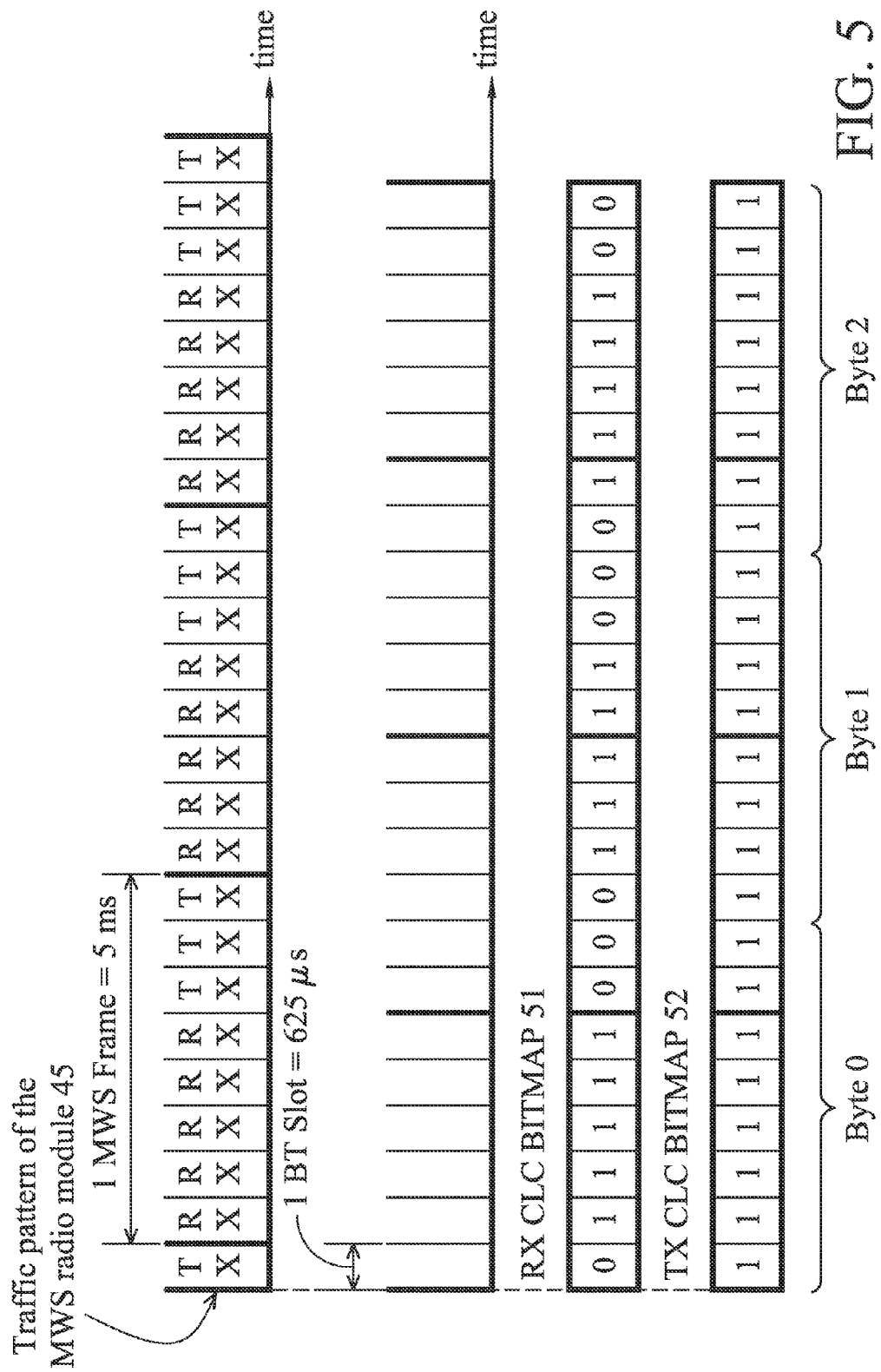
FIG. 5 is a block diagram illustrating an exemplary generation of RX/TX CLC bitmaps according to the embodiment of FIG. 4.

FIG. 5 is a block diagram illustrating an exemplary generation of RX/TX CLC bitmaps according to the embodiment of FIG. 4. In this embodiment, the data transmission of the BT radio module 46 does not interfere with the data reception of the MWS radio module 45, due to the fact that the BT radio module 46 operates in a hybrid mode in which relatively low transmission power is used or the MWS radio module 45 and the BT radio module 46 are equipped with an RX filter and a TX filter, respectively, to resist mutual interference. As shown in FIG. 5, each MWS frame is 5 milliseconds in length and contains eight time slots including five RX slots followed by three TX slots. Each BT slot is 625 microseconds in length. After frame synchronization, the MWS frames are aligned with BT slots in the time domain. Since every 24 BT slots are aligned with three MWS frames and the traffic pattern of the MWS radio module repeats for every frame, a 24-bits RX CLC bitmap and a 24-bits TX CLC bitmap are generated to represent the allocations of 24 forthcoming BT slots for possible data transmission or reception. However, the length of the TX/RX CLC bitmap is variable. If the data transmission of the MWS radio module 45 is estimated to interfere with the data reception of the BT radio module 46, the BT radio module 46 does not schedule data reception in any of the MWS TX slots. Accordingly, a BT RX CLC bitmap 51 is generated to indicate whether each of the 24 forthcoming BT slots may be used for receiving operations, wherein a "1" bit indicates availability for data reception and a "0" bit indicates unavailability for data reception. Similarly, a BT TX CLC bitmap 52 is generated to indicate whether each of the 24 forthcoming BT slots may be used for transmitting operations, which contains only "1" bit, for indicating availability for data transmission in all BT slots.

Figure 6:
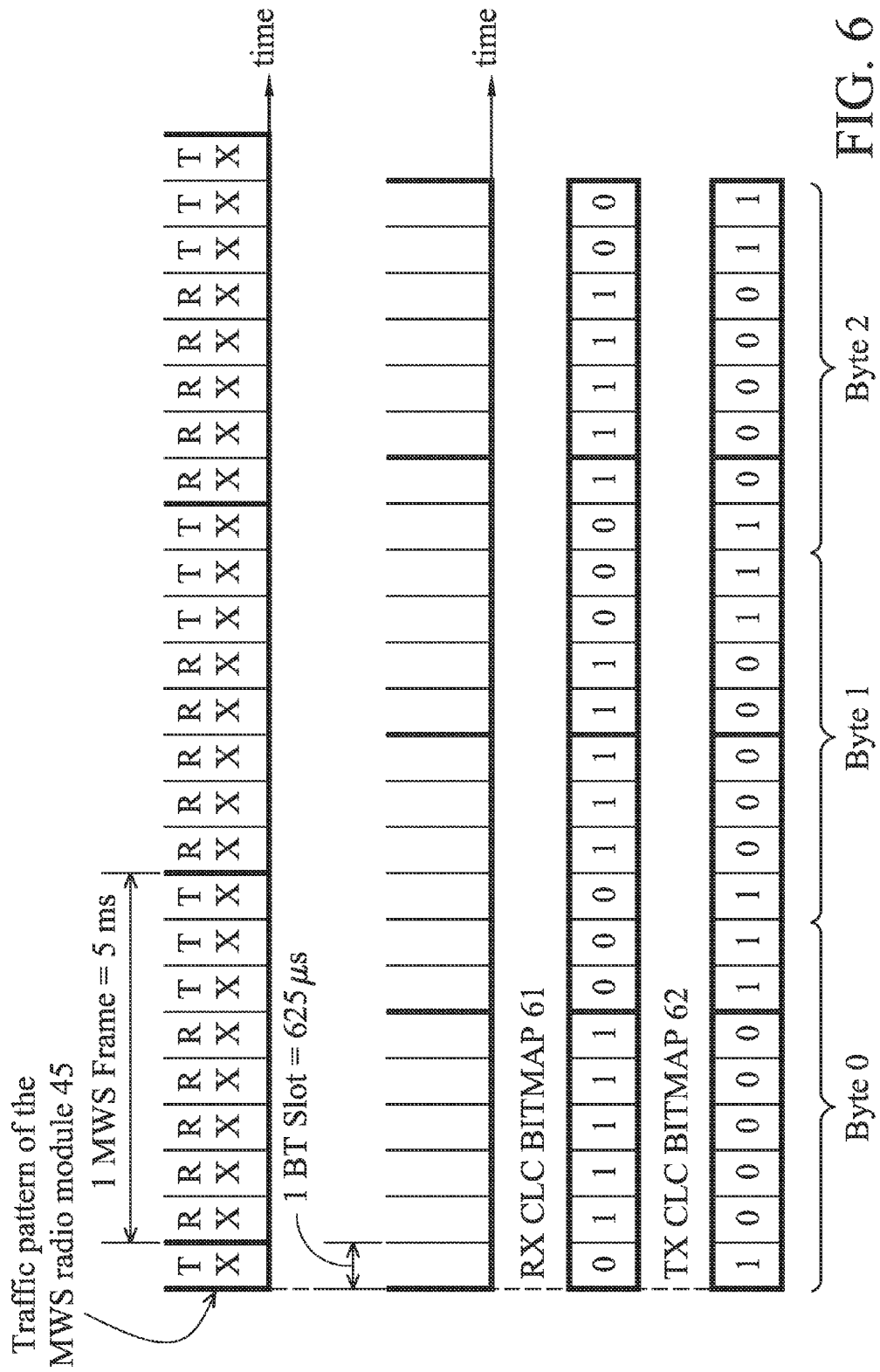
FIG. 6 is a block diagram illustrating an exemplary generation of RX/TX CLC bitmaps according to another embodiment of the invention.

FIG. 6 is a block diagram illustrating an exemplary generation of RX/TX CLC bitmaps according to another embodiment of the invention. The MWS frames and traffic patterns in FIG. 6 is the same as the MWS frames and traffic patterns illustrated in FIG. 5. However, in this embodiment, neither the BT radio module 46 operates in a hybrid mode in which relatively low transmission power is used, nor the MWS radio module 45 and the BT radio module 46 are equipped with an RX filter and a TX filter, respectively, to resist mutual interference. Thus, the data transmission of the BT radio module 46 interferes with the data reception of the MWS radio module 45. Accordingly, the BT RX CLC bitmap 61 in FIG. 6 is the same as the BT RX CLC bitmap 51 in FIG. 5, while the BT TX CLC bitmap 62 is generated to indicate whether each of the 24 forthcoming BT slots may be used for transmitting operations, wherein a "1" bit indicates availability for data transmission and a "0" bit indicates unavailability for data transmission.

Figure 7:
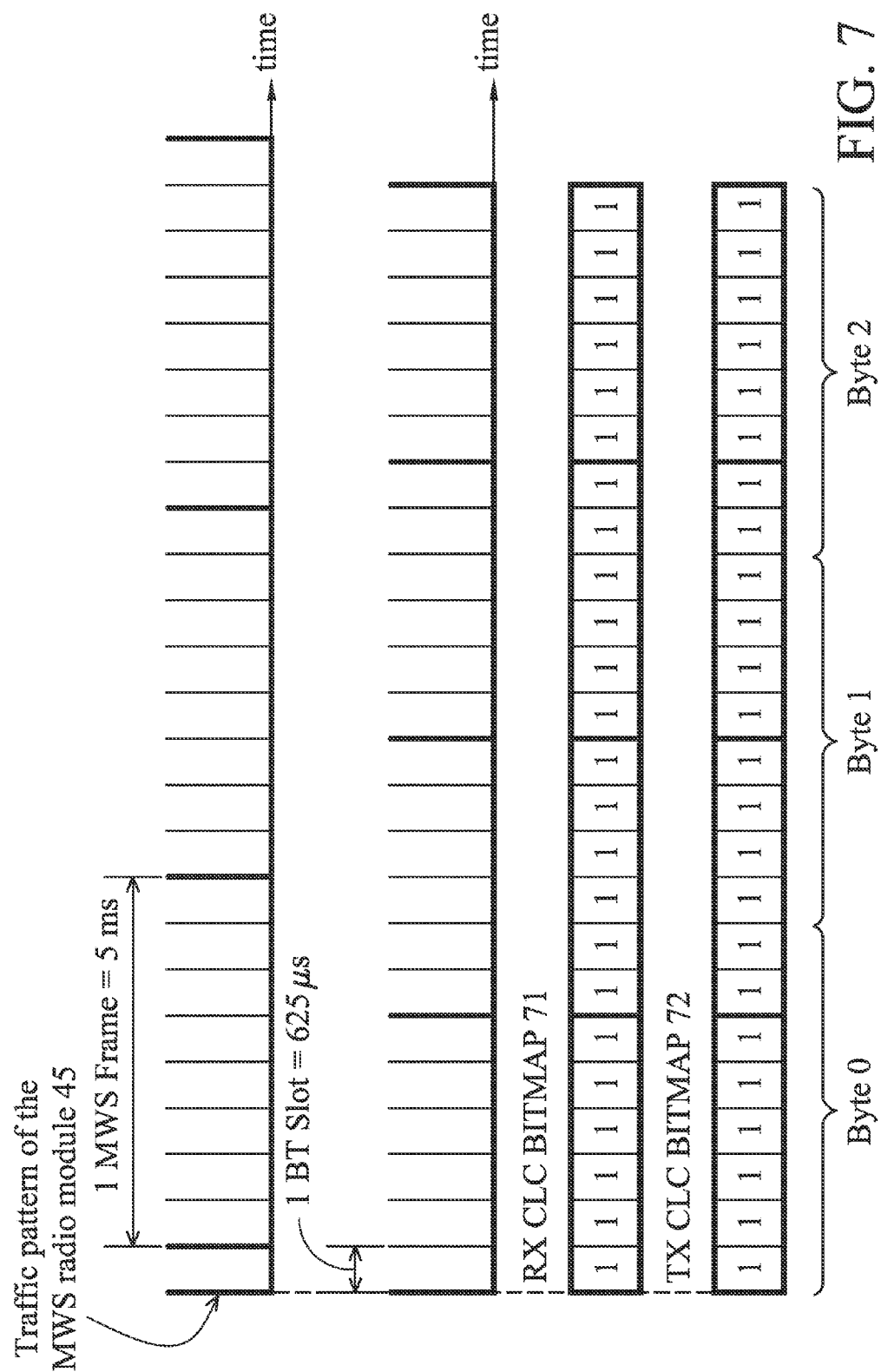
FIG. 7 is a block diagram illustrating an exemplary generation of RX/TX CLC bitmaps according to yet another embodiment of the invention.

FIG. 7 is a block diagram illustrating an exemplary generation of RX/TX CLC bitmaps according to yet another embodiment of the invention. In this embodiment, the operation status of the MWS radio module 45 is configured to be inactive, and thus, no transmitting and receiving operations are to be performed. Accordingly, a BT RX CLC bitmap 71 containing only "1" bit is generated to indicate availability for data receptions in all BT slots, and a BT TX CLC bitmap 72 containing only "1" bit is generated to indicate availability for data transmissions in all BT slots.

Specifically, the RX/TX CLC bitmaps may be negotiated to the BT headset 33, together with a set index, an offset parameter $D_{CLC}$, and an interval parameter $T_{CLC}$, via a Link Manager Protocol (LMP) message (e.g., LMP_CLC_BIT-MAP_CONFIG), wherein the set index is an identification indicator for the transmitting RX/TX CLC bitmaps, the offset parameter $D_{CLC}$ indicates the time offset from now to the time when the RX/TX CLC bitmaps are to be applied, and the interval parameter $T_{CLC}$ indicates the length of time for using the RX/TX CLC bitmaps. In addition, the LMP message may further comprise an initialization flag for preventing clock wrap-around problems. Specifically, a "0" bit is set for the initialization flag when the Most Significant Bit (MSB) of the current master clock is 0, to indicate that an initialization procedure 1 should be used to prevent clock wrap-around problems, and a "1" bit is set for the initialization flag when the Most Significant Bit (MSB) of the current master clock is 1, to indicate that an initialization procedure 2 should be used to prevent clock wrap-around problems. The first BT slot indicated by the Least Significant Bit (LSB) of byte 0 in the RX/TX CLC bitmaps is started on the slots for which the clock satisfies the following equations:

$$CLK_{27-1} \bmod T_{CLC} = D_{CLC} \qquad \text{:for initialization procedure 1}$$

$$((\sim CLK_{27}), CLK_{26-1}) \bmod T_{CLC} = D_{CLC}, \quad \text{:for initialization procedure 2}$$

wherein the clock value $CLK_{(k+1)}$ for the starting BT slot of the next RX/TX CLC bitmaps is found by adding the interval parameter $T_{CLC}$ to the clock value of the starting BT slot $CLK_{(k)}$ of the current RX/TX CLC bitmaps, as follows:

$$CLK_{(k+1)} = CLK_{(k)} + T_{CLC}$$

After different RX/TX CLC bitmaps sets, including RX/TX CLC bitmaps, a set index, an offset parameter $D_{CLC}$, and an interval parameter $T_{CLC}$, are negotiated, the BT radio module 46 may further inform the BT headset 33 about which of the negotiated CLC bitmaps sets to be used in a forthcoming period of time, via another Link Manager Protocol (LMP) message (e.g., LMP_CLC_BITMAP_REQ).

Figure 8:
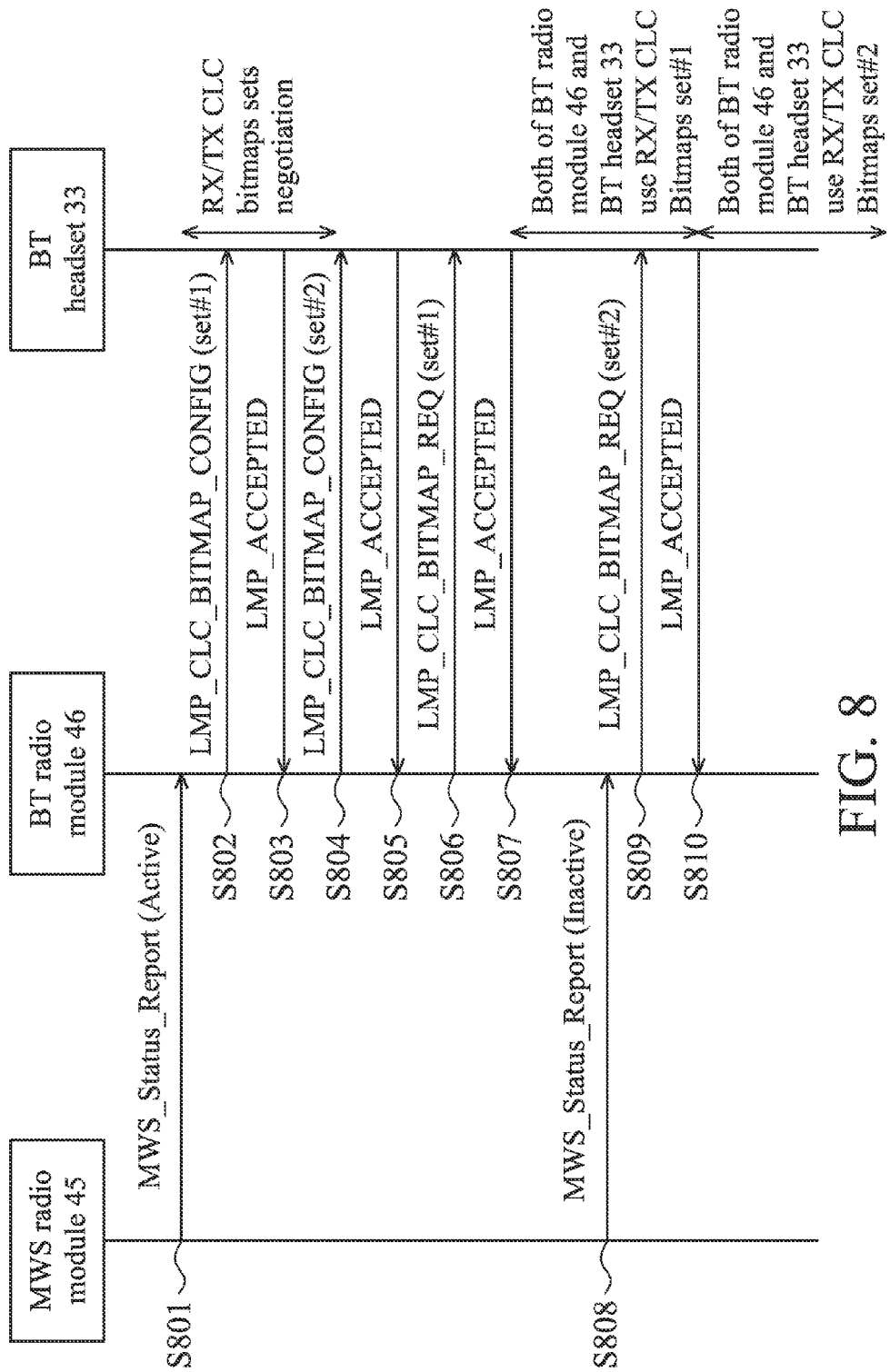
FIG. 8 is a message sequence chart illustrating negotiation of RX/TX CLC bitmaps according to an embodiment of the invention.

FIG. 8 is a message sequence chart illustrating negotiation of RX/TX CLC bitmaps according to an embodiment of the invention. In this embodiment, the MWS radio module 45 and the BT radio module 46 are both switched off. Later, when the MWS radio module 45 and the BT radio module 46 are switched on, the MWS radio module 45 determines its traffic patterns, including the traffic patterns for the active state and inactive state, and then transmits a notification signal to the BT radio module 46 to indicate the operation status change in a forthcoming period of time (step S801). In response to the notification signal, the BT radio module 46 obtains the traffic patterns of the MWS radio module 45 via the coexistence-signaling interface 49. Based on the obtained traffic patterns, the BT radio module 46 generates two sets of RX/TX CLC bitmaps for the co-located MWS radio module 45 being in active and inactive states (denoted as RX/TX CLC bitmaps set#1 and set#2, respectively) according to scheduled allocations of slots for the forthcoming transmitting or receiving operations, and then starts negotiating the RX/TX CLC bitmaps sets with the BT headset 33. Specifically, the BT radio module 46 first transmits the RX/TX CLC bitmaps set for active MWS radio module 45, i.e., the RX/TX CLC bitmaps set#1, to the BT headset 33 via an LMP message (e.g., LMP_CLC_BITMAP_CONFIG) (step S802). The LMP message may further comprise other related information, such as the index of the RX/TX CLC bitmaps set, an offset parameter $D_{CLC}$, an interval parameter $T_{CLC}$, and an initialization flag as mentioned above. In response to the LMP message, the BT headset 33 replies to the BT radio module 46 with an LMP response message (e.g., LMP_ACCEPTED) (step S803). In another embodiment, if the BT headset 33 does not accept the RX/TX CLC bitmaps set from the BT radio module 46, the BT headset 33 may reply to the BT radio module 46 with another LMP message containing adjusted RX/TX CLC bitmaps. Next, the BT radio module 46 transmits the RX/TX CLC bitmaps set for inactive MWS radio module 45, i.e., the RX/TX CLC bitmaps set#2, to the BT headset 33 via an LMP message (e.g., LMP_CLC_BITMAP_CONFIG) (step S804). In response to the LMP message, the BT headset 33 replies to the BT radio module 46 with an LMP response message (e.g., LMP_ACCEPTED) (step S805). Note that, the steps of negotiations may be repeated, if there are more than two RX/TX CLC bitmaps sets, until all RX/TX CLC bitmaps sets are negotiated between the BT radio module 46 and the BT headset 33. Based on the negotiation result and the notification signal, the BT radio module 46 selects the RX/TX CLC bitmaps set#1 (e.g., the RX/TX CLC bitmaps as shown in FIG. 5) to be used in a first forthcoming period of time, and then informs the BT headset 33 about the set index of RX/TX CLC bitmaps via another LMP message (e.g., LMP_CLC_BITMAP_REQ) (step S806). When receiving the LMP message, the BT headset 33 replies to the BT radio module 46 with an acknowledgement via another LMP response message (e.g., LMP_ACCEPTED) (step S807), and then uses the RX/TX CLC bitmaps set#1, for performing transmitting and/or receiving operations. When receiving the acknowledgement, the BT radio module 46 correspondingly uses the RX/TX CLC bitmaps set#1 for performing transmitting and/or receiving operations.

Subsequently, when the MWS radio module 45 detects that its operation status is about to change from active to inactive, it transmits another notification signal to the BT radio module 46 to indicate the operation status change in another forthcoming period of time (step S808). In response to the notification signal, the BT radio module 46 informs the BT headset 33 about the set index of RX/TX CLC bitmaps via another LMP message (e.g., LMP_CLC_BITMAP_REQ) (step S809). When receiving the LMP message, the BT headset 33 replies to the BT radio module 46 with an acknowledgement via another LMP response message (e.g., LMP_ACCEPTED) (step S810), and then uses the RX/TX CLC bitmaps set#2, for performing transmitting and/or receiving operations. When receiving the acknowledgement, the BT radio module 46 correspondingly uses the RX/TX CLC bitmaps set#2 for performing transmitting and/or receiving operations. Note that, if the traffic patterns of the MWS radio module 45 changes after the negotiation steps S820~S850, another negotiation of RX/TX CLC bitmaps sets may be initiated to update the RX/TX CLC bitmaps sets between the BT radio module 46 and the BT headset 33.

Figure 9:
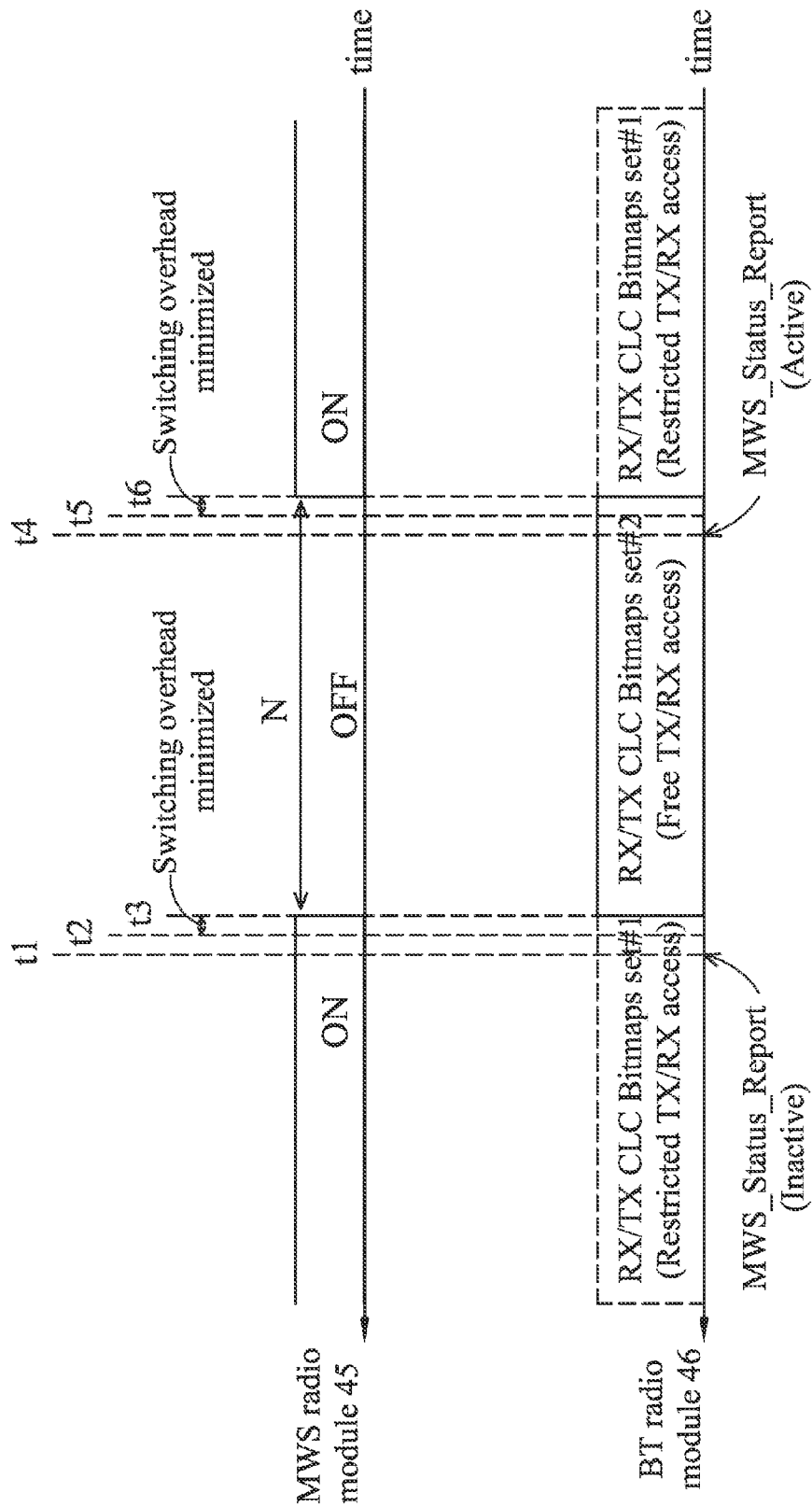
FIG. 9 is a block diagram illustrating detection of operation status changes of the MWS radio module 45 according to an embodiment of the invention.

FIG. 9 is a block diagram illustrating detection of operation status changes of the MWS radio module 45 according to an embodiment of the invention. In this embodiment, frame synchronization is performed first, so that the MWS frames are aligned with BT slots in the time domain, and negotiation of RX/TX CLC bitmaps sets is also performed, so that the RX/TX CLC bitmaps sets in the BT radio module 46 and the BT headset 33 are in-sync. As shown in FIG. 9, at time t1, the MWS radio module 45 detects that the current activities, e.g., transmitting operations and/or receiving operations, are about to stop at time t3 for a period of time N, i.e., its operation status is about to change from active to inactive at time t3 for the period of time N. Specifically, the MWS radio module 45 may periodically perform the early detection to see if the current activities are about to stop after a predetermined period of time. Also, at time t1, the MWS radio module 45 transmits a notification signal to the BT radio module 46 to indicate the operation status change of the MWS radio module 45 in a forthcoming period of time. When receiving the notification signal, the BT radio module 46 determines an indicator indicating at least one of the BT TX and RX CLC bitmaps sets (referred to herein as BT CLC bitmaps sets) which were previously negotiated to the BT headset 33, e.g., the RX/TX CLC bitmaps set#2, according to the to-be-changed operation status of the MWS radio module 45, and then transmits the indicator to the BT headset 33 at time t2. When receiving the indicator, the BT headset 33 replies to the BT radio module 46 with an acknowledgement of the indicator, and then switches the currently used BT CLC bitmaps set to the BT CLC bitmaps set indicated by the indicator. When receiving the acknowledgement at time t3, the BT radio module 46 correspondingly switches the currently used BT CLC bitmaps set to the BT CLC bitmaps set indicated by the indicator. Similarly, when the MWS radio module 45 detects that the current activities are about to recover at time t6, it transmits another notification signal to the BT radio module 46, at time t4, to indicate its operation status change in a forthcoming period of time. In response to the notification signal, the BT radio module 46 determines an indicator indicating at least one of the BT TX and RX CLC bitmaps sets (referred to herein as BT CLC bitmaps sets) which were previously negotiated to the BT headset 33, e.g., the RX/TX CLC bitmaps set#1, according to the to-be-changed operation status of the MWS radio module 45, and then transmits the indicator to the BT headset 33 at time t5. When receiving the indicator, the BT headset 33 replies to the BT radio module 46 with an acknowledgement of the indicator, and when the BT radio module 46 receives the acknowledgement at time t6, it correspondingly switches the currently used BT CLC bitmaps set to the BT CLC bitmaps set indicated by the indicator. Thus, the switching overhead of the used BT CLC bitmaps set may be minimized, and the schedule of the activities of the BT radio module 46 may be adjusted accordingly. Note that, the BT CLC bitmaps set used by the BT radio module 46 before time t3, e.g., the RX/TX CLC bitmaps set#1, indicates restricted TX/RX access, while the BT CLC bitmaps set used by the BT radio module 46 during time t3 and t6, e.g., the RX/TX CLC bitmaps set#2, indicates free TX/RX access. In other words, before time t3, the BT radio module 46 may selectively cancel or add one or more of the allocations of the slots for transmitting and/or receiving operations to prevent mutual interference from/to the MWS radio module 45, and during time t3 and t6, the BT radio module 46 may freely use the allocations of the slots for transmitting and/or receiving operations since no mutual interference may be occurred from/to the MWS radio module 45.

Figure 10:
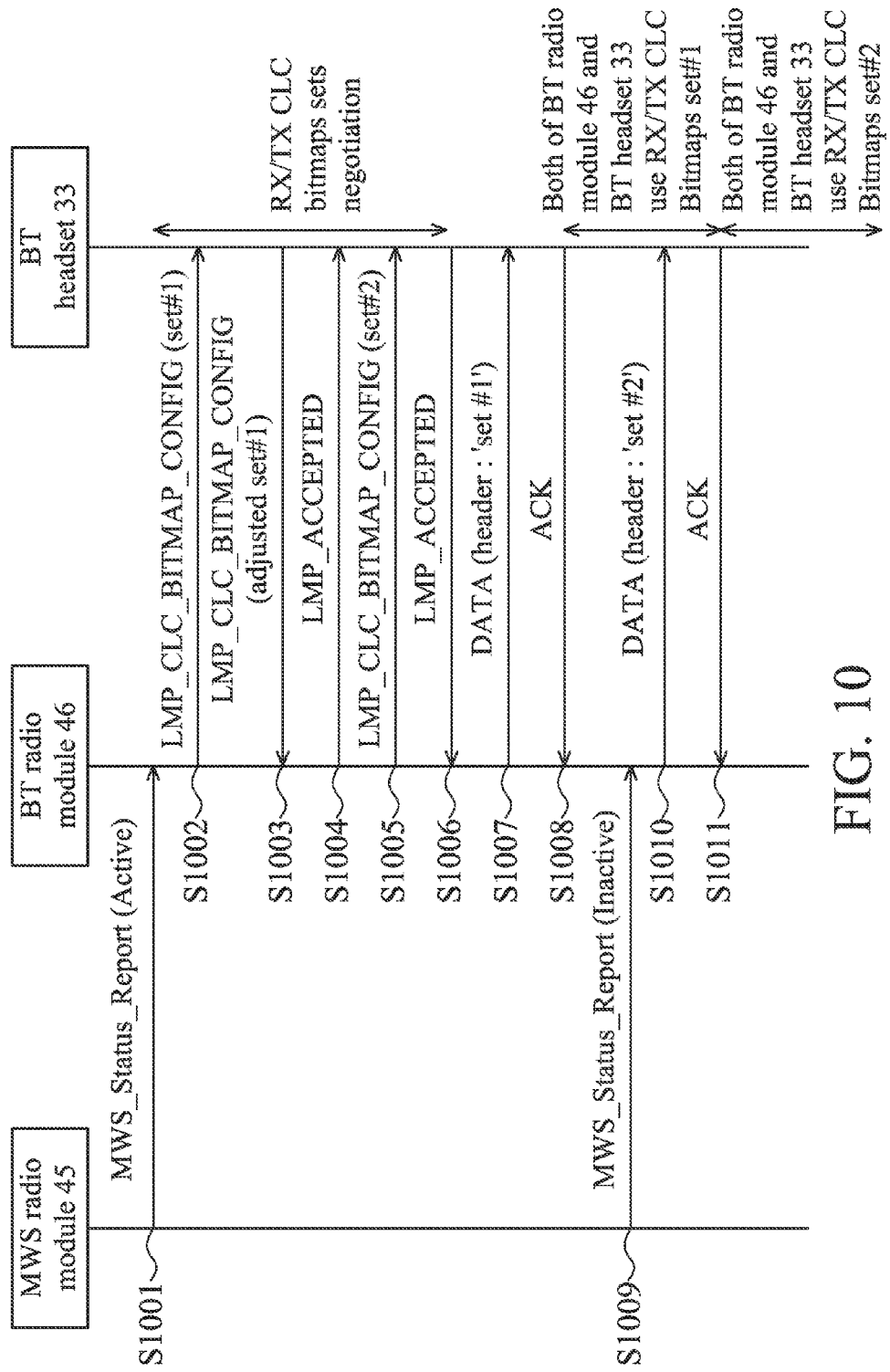
FIG. 10 is a message sequence chart illustrating fast activation of RX/TX CLC bitmaps according to an embodiment of the invention.

FIG. 10 is a message sequence chart illustrating fast activation of RX/TX CLC bitmaps according to an embodiment of the invention. Similar to FIG. 8, the MWS radio module 45 and the BT radio module 46 are both initially switched off. Later, when the MWS radio module 45 and the BT radio module 46 are switched on, the MWS radio module 45 determines its traffic patterns, including the traffic patterns for the active state and inactive state, and then transmits a notification signal to the BT radio module 46 to indicate the operation status change in a forthcoming period of time (step S1001). In response to the notification signal, the BT radio module 46 obtains the traffic patterns of the MWS radio module 45 via the coexistence-signaling interface 49. Based on the obtained traffic patterns, the BT radio module 46 generates two sets of RX/TX CLC bitmaps for the co-located MWS radio module 45 being in active and inactive states (denoted as RX/TX CLC bitmaps set#1 and set#2, respectively) according to scheduled allocations of slots for the forthcoming transmitting or receiving operations, and then starts negotiating the RX/TX CLC bitmaps sets with the BT headset 33. Specifically, the BT radio module 46 first transmits the RX/TX CLC bitmaps set for active MWS radio module 45, i.e., the RX/TX CLC bitmaps set#1, to the BT headset 33 via an LMP message (e.g., LMP_CLC_BITMAP_CONFIG) (step S1002). The LMP message may further comprise other related information, such as the index of the RX/TX CLC bitmaps set, an offset parameter $D_{CLC}$, an interval parameter $T_{CLC}$, and an initialization flag as mentioned above. When receiving the LMP message, the BT headset 33 determines that the RX/TX CLC bitmaps set contained in the LMP message is not acceptable, and adjusts the RX/TX CLC bitmaps set. Next, the BT headset 33 transmits the adjusted RX/TX CLC bitmaps set to the BT radio module 46 via an LMP message (e.g., LMP_CLC_BITMAP_CONFIG) (step S1003). When receiving the LMP message, the BT radio module 46 replies to the BT headset 33 with an LMP response message (e.g., LMP_ACCEPTED) in response to determining that the adjusted RX/TX CLC bitmaps set is acceptable (step S1004). The BT radio module 46 further transmits the RX/TX CLC bitmaps set for inactive MWS radio module 45, i.e., the RX/TX CLC bitmaps set#2, to the BT headset 33 via an LMP message (e.g., LMP_CLC_BITMAP_CONFIG) (step S1005). When receiving the LMP message, the BT headset 33 replies to the BT radio module 46 with an LMP response message (e.g., LMP_ACCEPTED) in response to determining that the RX/TX CLC bitmaps set is acceptable (step S1006). Note that, the steps of negotiations may be repeated, if there are more than two RX/TX CLC bitmaps sets, until all RX/TX CLC bitmaps sets are negotiated between the BT radio module 46 and the BT headset 33.

After the RX/TX CLC bitmaps set#1 and set#2 have been successfully negotiated between the BT radio module 46 and the BT headset 33, the BT radio module 46 subsequently informs the BT headset 33 for fast activation of a certain set of the previously negotiated RX/TX CLC bitmaps, via Media Access Control (MAC) header signaling. Specifically, the BT radio module 46 selects the RX/TX CLC bitmaps set#1 (e.g., the RX/TX CLC bitmaps as shown in FIG. 5) to be used in a first forthcoming period of time according to the negotiation result and the notification signal, and then performs a transmitting operation with a data header comprising an indicator for RX/TX CLC bitmaps set#1 (step S1007). When receiving the TX data from the BT radio module 46, the BT headset 33 replies to the BT radio module 46 with an acknowledgement of the TX data, and starts to use the RX/TX CLC bitmaps set#1. When receiving the acknowledgement, the BT radio module 46 correspondingly starts to use the RX/TX CLC bitmaps set#1 as well (step S1008). Subsequently, when the MWS radio module 45 detects that its operation status is about to change from active to inactive, it transmits a notification signal to the BT radio module 46 to indicate the operation status change in a forthcoming period of time (step S1009). In response to the notification signal, the BT radio module 46 performs another transmitting operation with a data header comprising an indicator for RX/TX CLC bitmaps set#2 (step S1010). When receiving the TX data from the BT radio module 46, the BT headset 33 replies to the BT radio module 46 with an acknowledgement of the TX data, and switches the currently used RX/TX CLC bitmaps set from set#1 to set#2. Lastly, the BT radio module 46 also switches the currently used RX/TX CLC bitmaps set from set#1 to set#2 when receiving the acknowledgement (step S1011).

Note that, in another embodiment, the RX/TX CLC bitmap set may be predetermined in the BT radio module 46 and the BT headset 33, so that the negotiation of RX/TX CLC bitmaps in FIG. 8 may be skipped and only fast activation of RX/TX CLC bitmaps (i.e., the steps S1010 to S1030) is required to be performed for switching the currently used RX/TX CLC bitmaps between the BT radio module 46 and the BT headset 33. In addition, there may be more than 2 sets of RX/TX CLC bitmaps corresponding to the operation status of the MWS radio module 45. In one embodiment, there may be 3 sets of RX/TX CLC bitmaps corresponding to the active operation status of the MWS radio module 45, wherein the first RX/TX CLC bitmap set corresponds to a full-active operation status of the MWS radio module 45, in which no transmitting or receiving operation of the BT radio module 46 is allowed to ensure that no interference is caused to the transmitting and/or receiving operations of the MWS radio module 45, the second RX/TX CLC bitmap set corresponds to a typical-active operation status of the MWS radio module 45, in which the traffic pattern of the MWS radio module 45 is as shown in FIG. 4, and the third RX/TX CLC bitmap set corresponds to an untypical-active operation status of the MWS radio module 45, in which each MWS frame in the traffic pattern of the MWS radio module 45 contains eight time slots including 4 consecutive TX slots followed by 4 consecutive RX slots; and the invention is not limited thereto.

Furthermore, during the negotiation of RX/TX CLC bitmaps as illustrated in FIG. 8, more than one set of RX/TX CLC bitmaps may be transmitted to the BT slave device to reduce the number of LMP message transmissions and receptions, for the case where the traffic pattern of the MWS radio module 45 rarely changes. For example, 4 sets of RX/TX CLC bitmaps may be transmitted to the BT slave device via an LMP message. Accordingly, the determined indicator as illustrated in FIG. 10 may be used to identify the combination of the 4 sets of RX/TX CLC bitmaps to be used upon the operation status change of the MWS radio module 45. For example, a first combination contains 2 RX/TX CLC bitmap set #1, 1 RX/TX CLC bitmap set #2, and 1 RX/TX CLC bitmap set #3, and a second combination contains 1 RX/TX CLC bitmap set #1, 2 RX/TX CLC bitmap set #2, and 1 RX/TX CLC bitmap set #3, etc.

Figure 11:
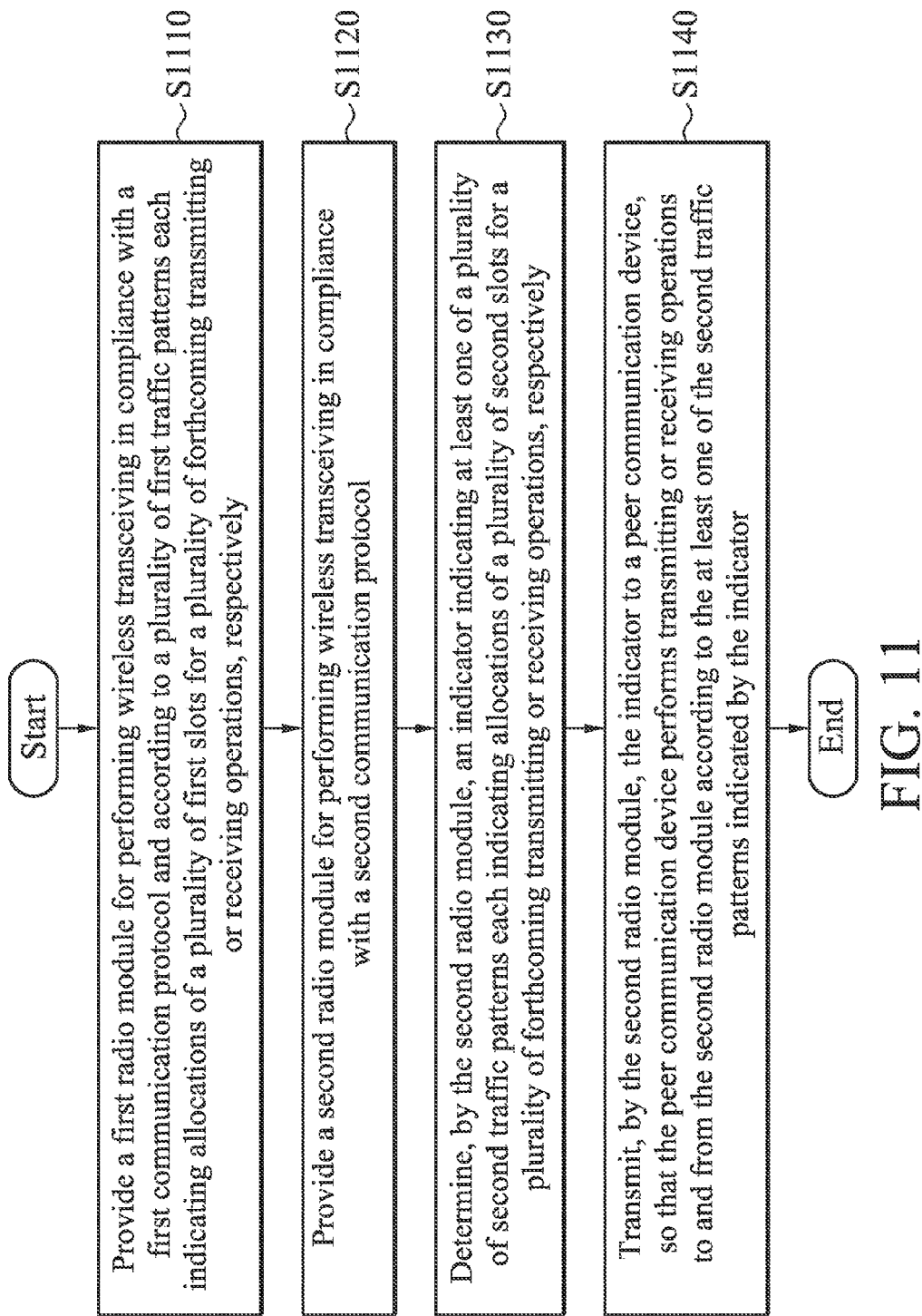
FIG. 11 is a flow chart illustrating an activity coordination method according to an embodiment of the invention.

FIG. 11 is a flow chart illustrating an activity coordination method according to an embodiment of the invention. The activity coordination method may be applied in any wireless communication device comprising a plurality of co-located radio modules, i.e., any multi-radio terminals, such as the MRT 32, for coordinating the operations of the multiple radio modules such that some transmitting and/or receiving operations of a radio module may be selectively skipped to prevent mutual interference between the multiple radio modules and to save power. To begin the activity coordination method, a first radio module is provided for performing wireless transceiving in compliance with a first communication protocol and according to a plurality of first traffic patterns which each indicates allocations of a plurality of first slots for a plurality of forthcoming transmitting or receiving operations, respectively (step S1110), and a second radio module is provided for performing wireless transceiving in compliance with a second communication protocol (step S1120). Taking the MRT 32 as an example, the first radio module may refer to the MWS radio module 45 and the second radio module may refer to the BT radio module 46. In one embodiment, the MWS radio module 45 may be a WiMAX radio module that operates at 2.3-2.4 or 2.496-2.690 GHz, while the BT radio module 46 operates at 2.402-2.480 GHz. In another embodiment, the MWS radio module 45 may be a WiFi radio module that operates at 2.412-2.4835 GHz. Subsequently, the second radio module determines an indicator indicating at least one of a plurality of second traffic patterns which each indicates allocations of a plurality of second slots for a plurality of forthcoming transmitting or receiving operations, respectively (step S1130). Specifically, the second slots are aligned with the first slots, and one or more allocations of the second slots are selectively determined for cancellation or addition according to the first traffic patterns. Taking the embodiment of FIG. 6 for example, one of the first traffic patterns may refer to the WiMAX traffic pattern in which each MWS frame contains eight time slots including five RX slots followed by three TX slots, and the second traffic patterns corresponding to the concurrent time slots may refer to the RX CLC bitmap 61 and the TX CLC bitmap 62, wherein the first RX slot in the RX CLC bitmap 61 and the TX slots in the TX CLC bitmap 62 are deliberately given up to prevent mutual interference between the first radio module and the second radio module. After that, the second radio module transmits the indicator to a peer communication device, so that the peer communication device performs transmitting or receiving operations to and from the second radio module according to the at least one of the second traffic patterns indicated by the indicator (step S1140). Specifically, the indicator may be transmitted via a MAC data header in the transmitted data of the second radio module. The peer communication device may further reply to the second radio module with an acknowledgement for acknowledging the reception of the transmitting data, and the indicator is used for selecting at least one of the second traffic patterns when the acknowledgment is replied to. Meanwhile, the second radio module also performs transmitting or receiving operations to and from the peer communication device according to the at least one of the second traffic patterns indicated by the indicator, when receiving the acknowledgement. Note that, in one embodiment, the first traffic patterns and the second traffic patterns may be pre-negotiated from the second radio module to the peer communication device, before the activity coordination method is applied, as described in the embodiment of FIG. 10. In another embodiment, the first traffic patterns and the second traffic patterns may be predetermined in the second radio module and the peer communication device, so that no negotiation of the first and second traffic patterns is required.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). For example, although a WiMAX radio module and a WiFi radio module are used in the detailed description, a Long Term Evolution (LTE) device may be used as a co-located radio module instead. In addition, the BT device co-located with another radio module may be either a BT master or a BT slave. Therefore, the scope of the appended claims should be accorded the broadest interpretation so as to encompass all such modifications and similar arrangements.

What is claimed is:

1. A wireless communication device, comprising:
   a first radio module, performing wireless transceiving in compliance with a first communication protocol and according to a plurality of first traffic patterns which each indicates allocations of a plurality of first slots for a plurality of forthcoming transmitting or receiving operations, respectively; and
   a second radio module, performing wireless transceiving in compliance with a second communication protocol, determining an indicator indicating at least one of a plurality of second traffic patterns which each indicates allocations of a plurality of second slots for a plurality of forthcoming transmitting or receiving operations, respectively, and transmitting the indicator to a peer communication device, so that the peer communication device performs transmitting or receiving operations to and from the second radio module according to the at least one of the second traffic patterns indicated by the indicator,
   wherein one or more allocations of the second slots are selectively determined by the second radio module according to the first traffic patterns, prior to the determining of the indicator, wherein one or more allocations of the second slots are canceled by the second radio module when the receiving operations in the corresponding second slots are estimated to be interfered by the transmitting operations of the first radio module, and wherein one or more allocations of the second slots are canceled by the second radio module when data transmissions in the corresponding second slots are estimated to be interfering with the receiving operations of the first radio module.

2. The wireless communication device as claimed in claim 1, wherein the second radio module further performs transmitting or receiving operations to and from the peer communication device according to the at least one of the second traffic patterns indicated by the indicator.

3. The wireless communication device as claimed in claim 1, wherein one or more allocations of the second slots are canceled when acknowledgements of data transmissions in the corresponding second slots are estimated to not have been received successfully due to interference from the first radio module.

4. The wireless communication device as claimed in claim 1, wherein the indicator is determined according to an operation status of the first radio module.

5. The wireless communication device as claimed in claim 4, wherein the determining of the indicator and the wireless transceiving are performed by the second radio module in response to a change of the operation status of the first radio module.

6. The wireless communication device as claimed in claim 4, wherein the first radio module generates a notification signal indicating a change of the operation status in a forthcoming period of time, and the determining of the indicator and the wireless transceiving are performed by the second radio module in response to the notification signal and the change of the operation status, respectively.

7. The wireless communication device as claimed in claim 1, wherein the second traffic patterns are predetermined in the second radio module and the wireless communication device.

8. The wireless communication device as claimed in claim 1, wherein the second traffic patterns are transmitted by the second radio module to the wireless communication device, prior to the determining of the indicator.

9. An activity coordination method for a wireless communication device comprising a plurality of co-located radio modules, comprising:
providing a first radio module for performing wireless transceiving in compliance with a first communication protocol and according to a plurality of first traffic patterns which each indicates allocations of a plurality of first slots for a plurality of forthcoming transmitting or receiving operations, respectively;
providing a second radio module for performing wireless transceiving in compliance with a second communication protocol;
determining, by the second radio module, an indicator indicating at least one of a plurality of second traffic patterns which each indicates allocations of a plurality of second slots for a plurality of forthcoming transmitting or receiving operations, respectively,
wherein one or more allocations of the second slots are selectively determined by the second radio module according to the first traffic patterns; and
transmitting, by the second radio module, the indicator to a peer communication device, so that the peer communication device performs transmitting or receiving operations to and from the second radio module according to the at least one of the second traffic patterns indicated by the indicator,
wherein one or more allocations of the second slots are canceled by the second radio module when the receiving operations in the corresponding second slots are estimated to be interfered by the transmitting operations of the first radio module, and wherein one or more allocations of the second slots are canceled by the second radio module when data transmissions in the corresponding second slots are estimated to be interfering with the receiving operations of the first radio module.

10. The activity coordination method as claimed in claim 9, further comprising configuring the second radio module to perform transmitting or receiving operations to and from the peer communication device according to the at least one of the second traffic patterns indicated by the indicator.

11. The activity coordination method as claimed in claim 9, wherein one or more allocations of the second slots are canceled when acknowledgements of data transmissions in the corresponding second slots are estimated to not have been received successfully due to interference from the first radio module.

12. The activity coordination method as claimed in claim 9, wherein the indicator is determined according to an operation status of the first radio module.

13. The activity coordination method as claimed in claim 12, wherein the steps of determining the indicator and configuring the second radio module are performed in response to a change of the operation status of the first radio module.

14. The activity coordination method as claimed in claim 12, further comprising generating a notification signal indicating a change of the operation status of the first radio module in a forthcoming period of time, wherein the steps of determining the indicator and configuring the second radio module are performed in response to the notification signal and the change of the operation status, respectively.

15. The activity coordination method as claimed in claim 9, wherein the second traffic patterns are predetermined in the second radio module and the wireless communication device.

16. The activity coordination method as claimed in claim 9, further comprising transmitting, by the second radio module, the second traffic patterns to the wireless communication device, prior to determining the indicator.

* * * * *